(No Model.) 2 Sheets—Sheet 1.

J. PAPE & M. WERMANN.
AUTOMATIC CHANGING TABLET ON POST BOXES, &c.

No. 545,527. Patented Sept. 3, 1895.

Witnesses
James Daw
M. Bosch

Inventors
Jean Pape
Max Wermann
by Park Benjamin
their Attorney (No Model.) 2 Sheets—Sheet 2.

J. PAPE & M. WERMANN.
AUTOMATIC CHANGING TABLET ON POST BOXES, &c.

No. 545,527. Patented Sept. 3, 1895.

Witnesses
James Haw.
M. Bosch.

Inventors
Jean Pape
Max Wermann
By Park Benjamin
their Attorney.

UNITED STATES PATENT OFFICE.

JEAN PAPE AND MAX WERMANN, OF DRESDEN, GERMANY.

AUTOMATIC-CHANGING TABLET ON POST-BOXES, &c.

SPECIFICATION forming part of Letters Patent No. 545,527, dated September 3, 1895.

Application filed December 16, 1890. Serial No. 374,860. (No model.)

*To all whom it may concern:*

Be it known that we, JEAN PAPE, professor, and MAX WERMANN, bookbinder, of Dresden, in the Kingdom of Saxony and German Empire, have invented new and useful Improvements in Automatic-Changing Tablets on Post-Boxes, &c., of which the following is a specification, reference being had therein to the accompanying drawings.

This invention relates to an appliance capable of being used either alone or in combination with a letter-box which will enable a visitor to leave a written message for the occupant of any particular dwelling. This is effected by means of a tablet safely inclosed both before and after writing and withdrawn from inspection when written upon.

The apparatus is illustrated in Figures 1 to 7 of the accompanying sheets of drawings, in which—

Figure 1:
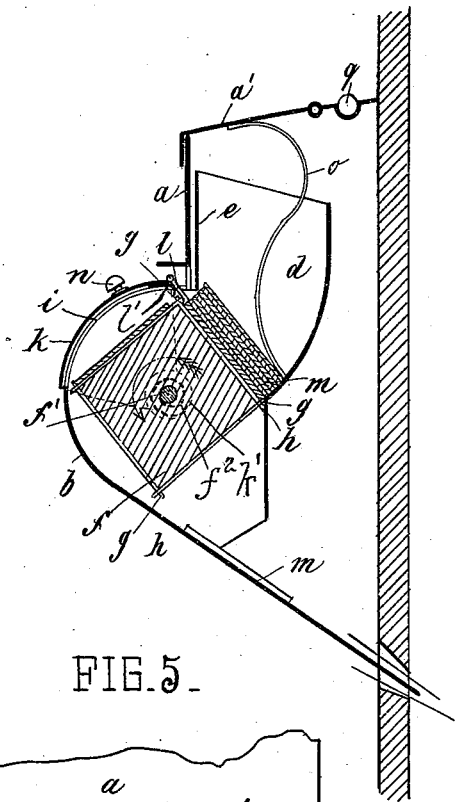
Figure 7:
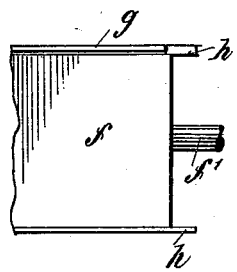
Figure 5:
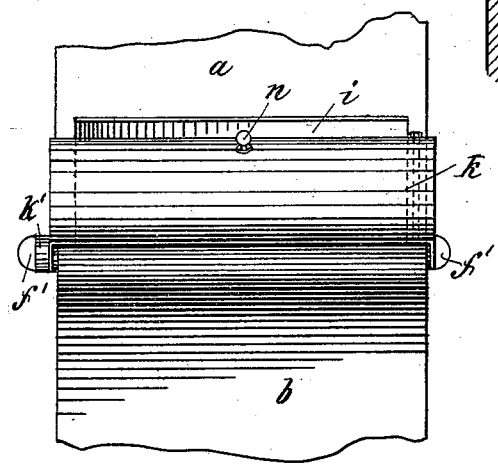
Figure 4:
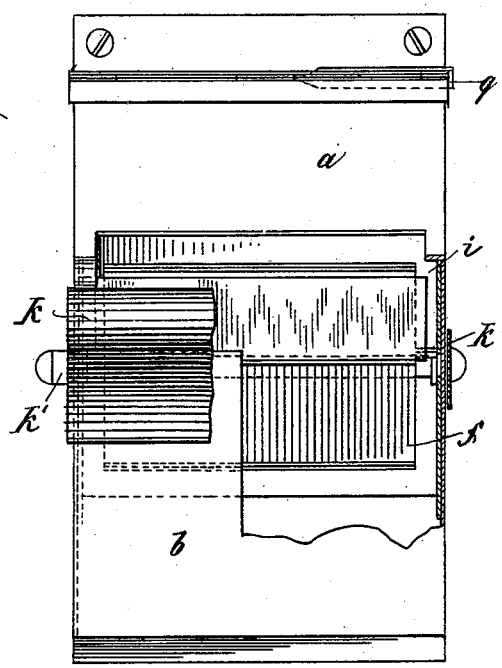
Figure 2:
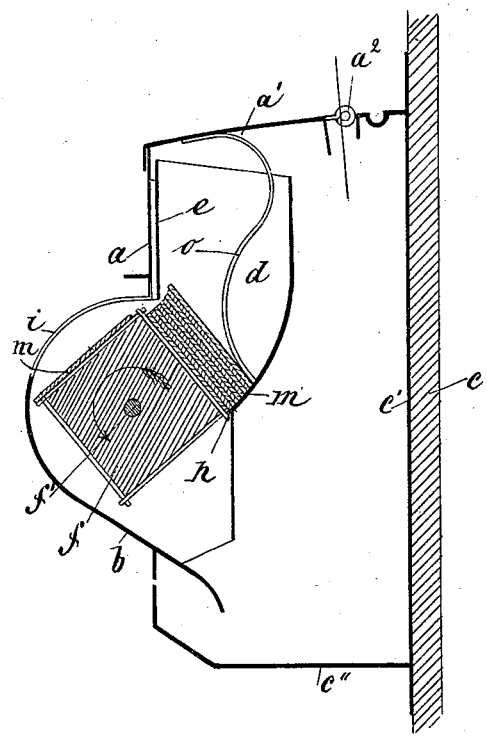
Figure 3:
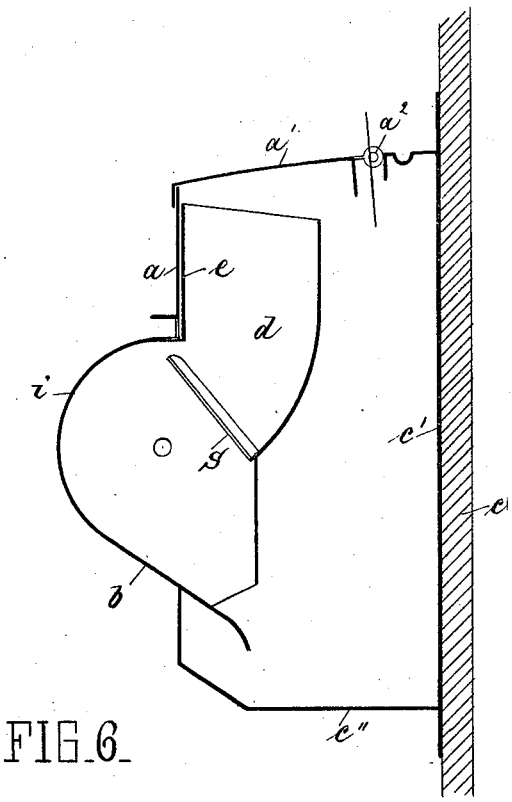
Figure 6:
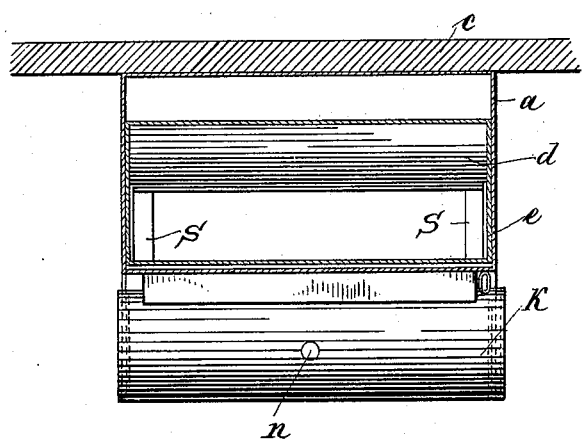

Fig. 1 represents a section of the appliance, and Fig. 2 shows the same combined with a letter-box. Fig. 3 shows the appliance without a drum, and Figs. 4 to 7 represent details.

As seen in Fig. 1, the apparatus consists in a casing $a$, attached to the door $c$ of a room of a house or apartment, the casing being shaped like a letter-box and having a projecting portion $b$ at its lower part. The bottom of the projecting part $b$ of the casing is inclined downwardly and enters a slot in the door $c$. Within the casing is a receptacle $d$, open above and below, the front of the receptacle being cut away. In the side walls of this receptacle is journaled the spindle $f'$ of the four-sided drum $f$, which can be rotated in the space formed between the projecting part $b$ and the back of the receptacle $d$, as hereinafter described. An opening is provided in the projecting portion $b$, which is of a size sufficient to permit of the drum to be viewed from the outside, as is apparent from Fig. 2. Narrow supports $s$ are also provided at each end of the casing, which are somewhat shorter than the diameter of the drum and are in line with one side of the drum when the latter is in the position shown in Figs. 1 and 2. At its horizontal edges the drum is provided with projecting ledges $g$, which are of a height corresponding to the thickness of the cards or other tablets which are to be placed in the receptacle. From one or both ends extend projections $h$. Over the cut-away portion of the projection $b$ is fitted a curved lid $k$, provided with a button or handle $n$. This cover is preferably journaled upon the projecting ends of the spindle $f'$ and can be raised or lowered by the handle to hide or disclose the opening $i$. In order that the lid may be kept normally closed, a coiled spring $f^2$ surrounds the end of the casing, preferably within an inclosing cap or casing $k'$, one end of the spring being connected with the lid and the other with the casing. The spring is shown in dotted lines in Fig. 1. A hook is pivotally connected to one or both ends of the upper edge of the cover and is held normally depressed when the cover is open by a yielding support, such as a spring $l'$, so that when the cover rises to close the opening the hook $l$ strikes against the upper edge of the opening $i$ and is thereby forced downward into engagement with one of the projections $h$.

Into the receptacle $d$ are placed the cards or plates, of any suitable material, through the lid $a'$ with which the casing is fitted for this purpose. These cards, plates, or tablets rest upon the supports $s$ and one face of the drum when the drum is in normal position, and a flat spring $o$ on the lid $a'$ exerts a pressure upon them to hold them in place.

When a person desires to leave a message, the parts being in the position shown in Fig. 1, the handle $n$ is grasped and pulled down to expose the opening, and the movement of the lid through the connecting-hook $l$ rotates the drum. The ledge $g$, which is behind the bottom card or plate, engages it and carries it around into position in front of the opening. The other plates will be forced backward against the pressure of the spring by the corner of the drum until said corner passes the center, when in the continued movement of the drum they will again return upon the supports $s$ and the newly-presented flat side of the drum, and by reason of the spring holding them firmly against the said flat side of the drum will hold it against further movement until the above operation is repeated. The drum having been rotated, as above described, the operator writes the desired message upon the card or tablet and releases the lid, when the spring at once returns it to normal position. The device is then ready for a second person to operate in precisely the same manner, and it will be seen that when the lid is pulled again the rotation of the drum will drop the previously-written card upon the inclined bottom, whence it will be deposited through the opening in the door.

Figs. 2 and 3 show this appliance in connection with a letter-box, being, however, so far modified that the lid $k$, covering aperture $i$ and operating the drum, is dispensed with and the drum is rotated by hand. The lid $a'$ of the casing $a$ has a slit $a^2$, through which letters are passed. The casing $a$ also has a back $c'$ and a bottom $c''$, connected with the latter. The end of the projection $b$ passes just over the bottom $c''$, so that the letters thrown through the slit $a^2$, as well as the memorandum plates or tablets, fall on the bottom $c''$ and may be removed through a door. (Not shown in the drawings.)

What we claim, and desire to secure by Letters Patent of the United States, is—

1. In combination, the box or casing, the polygonal drum journaled therein, the receptacles for tablets or cards above said drum, the movable cover covering the exposing opening for said drum, means whereby the movement of the cover will rotate the drum, said drum having flanges or ledges to engage the bottom tablet or card and carry it in front of the exposing opening, substantially as described.

2. In combination, the casing having an exposing opening, the polygonal drum journaled in said casing, and having ledges on its edges, the receptacle above said drum having an open bottom arranged to deliver tablets to the drum, the cover for permitting access to said receptacle, a spring carried by said cover arranged to bear normally against the pile of tablets, the movable cover for the exposing opening, and means whereby the movement of the cover will rotate the drum one step, substantially as described.

3. In combination, the casing having an exposing opening, the polygonal drum journaled in said casing and having ledges $g$ on its longitudinal edges, and projections $h$, the open ended receptacle within the casing arranged to hold a pile of tablets, a filling opening to the casing above the receptacle having a suitable cover, a spring carried by said cover depending within the receptacle and arranged to bear on the pile of tablets, the movable cover for the exposing opening having a spring for closing the same, and a hook carried by the cover arranged to engage the projections $h$, substantially as described.

JEAN PAPE.
MAX WERMANN.

Witnesses:
W. BINDEWAHL,
W. SCHWIETHAL.